June 16, 1931.  C. W. HANSELL  1,810,475
RECEIVER
Filed May 2, 1927
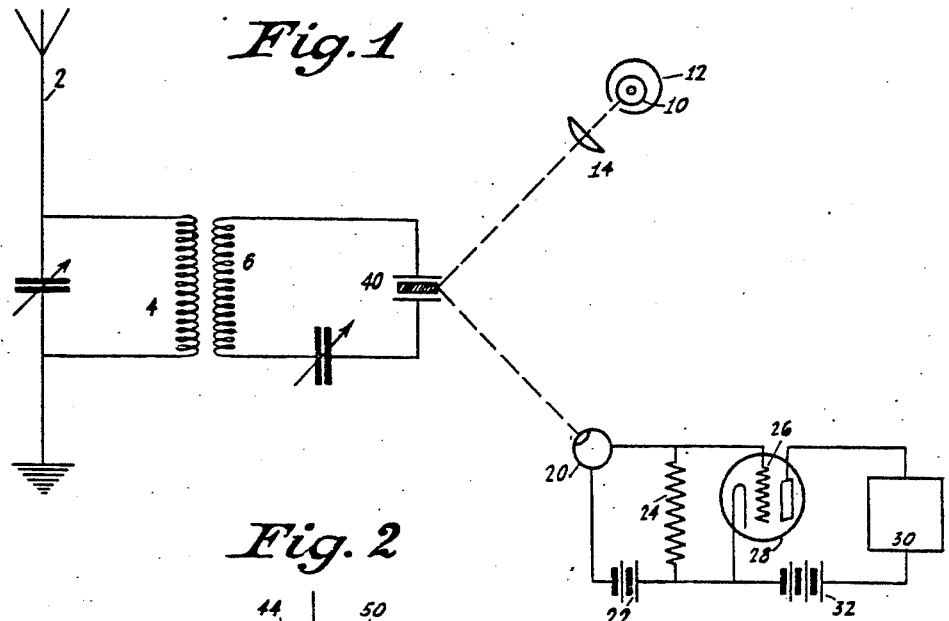
Fig.1
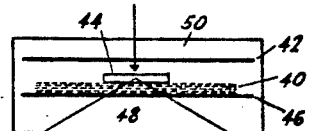
Fig.2
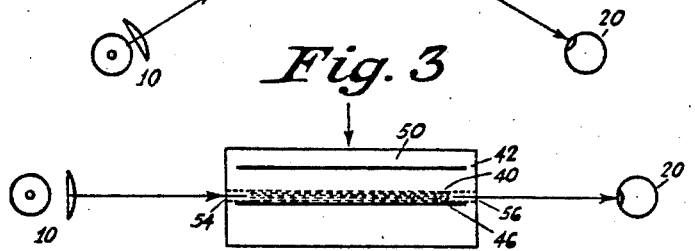
Fig.3
Fig.4
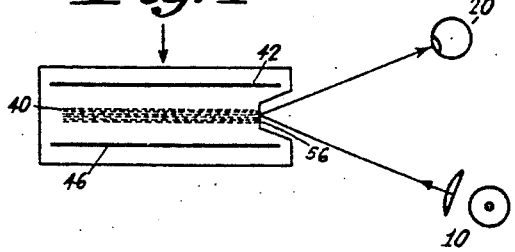
INVENTOR
C.W. HANSELL
BY
ATTORNEY Patented June 16, 1931

1,810,475

UNITED STATES PATENT OFFICE

CLARENCE W. HANSELL, OF ROCKY POINT, LONG ISLAND, NEW YORK, ASSIGNOR TO RADIO CORPORATION OF AMERICA, A CORPORATION OF DELAWARE

RECEIVER

Application filed May 2, 1927. Serial No. 188,155.

This invention relates to receivers and more particularly to a novel detecting or signal rectifying means therefor.

Because of increasing closeness of signal frequencies being used for communication purposes it becomes increasingly important to have receivers which are highly selective. An object of this invention is to provide a receiver with detecting means which in itself is selective, independently of the selectivity of the associated syntonized circuits. This I do by employing for one part of the detecting means a piezo-electric crystal having a natural frequency equal to the frequency of the desired signal. For energy of the natural frequency a piezo-electric crystal experiences a marked decrease in impedance and, in fact, acts like a series resonant circuit of exceedingly low resistance, or a large condenser. The resonance curve for this phenomenon is very sharply peaked, indicating that the crystal itself is inherently remarkably selective.

Most detectors formerly known in the art have a high resistance, and therefore require higher signal potential than would be necessary if a detector having a very low resistance were employed. It is accordingly a further object of my invention to provide a detector which, for the desired signal, has an extremely low resistance, and which therefore is sensitive to even small available signal energy.

The phenomenon of detection is really one of rectification, and usually is obtained by utilizing, or by adding to a direct current, only the positive or the negative half cycles of an alternating current. But this is not a necessary procedure, and the only essential requirement, stated broadly, is that a unidirectional current be modified in amplitude under the control of an alternating current. The method I use includes applying the alternating current to a piezo-electric crystal, and focusing a beam of light upon the crystal in such a manner that it will be alternately reflected and absorbed, or otherwise allowed to alternately illuminate and not illuminate a photo-electric cell. A direct current flowing thru the photo-electric cell is modified in amplitude in accordance with these changes in intensity of light energization, and the modification is in either an additive or a subtractive sense, as preferred.

The more detailed specification which follows is accompanied by drawings in which Figure 1 is a wiring diagram of my invention in simplest form;

Figure 2 is an arrangement for reflecting a beam of light only during oscillation of a crystal;

Figure 3 is an arrangement for transmitting a beam of light only during oscillation of a crystal; and Figure 4 is an arrangement wherein the reflected beam of light is properly directed upon a photo-electric cell only during part of the oscillation of a crystal.

Referring to Figure 1 energy is collected on the antenna 2 and supplied to the resonant circuit 4 to which is coupled a resonant circuit 6. A piezo-electric crystal 40 is connected to the circuit 6 as shown.

A source of light 10 is surrounded by a slitted jacket 12, and the emitted beam is properly focused by a suitable focusing device 14. This beam of light is made to cooperate with the crystal 8 by any of the arrangements shown in Figures 2, 3 or 4, or other equivalent arrangements, and thence is projected upon a photo-electric cell or light sensitive body 20. This is in circuit with any suitable amplifying and translating means, and in the present case has been most simply represented by source current 22 and a resistance 24, the potential fluctuations across which, upon variations of the resistance of the cell 20, are impressed upon the grid 26 of a three electrode tube 28. In the anode circuit of this tube there is a signal recording device 30 and a direct current supply 32. It is clear that the translating means, instead of being a recording device, may equally well be an optical device, or, through the medium of some suitable buzzer or interrupter, an acoustic device.

Adverting now to Figure 2, the crystal 40 is supported within the crystal holder 42 in which there is a window 44. This window is located above the crystal 40 when the latter is at rest upon the lower electrode 46. The surface 48 as well as the rear surface of the window 44 are made light absorbent, so that light from the light source 10 is not reflected upon the photo-electric cell 20. However, upon oscillation of the crystal 40 it vibrates transversely of the window 44 and acts as a mirror to reflect light upon the cell 20.

In Figure 3 the crystal 40 rests upon a lower electrode 46, within a crystal holder 42 having apertures 54 and 56 in its opposite sides. In this case the crystal is made opaque, in consequence of which light from the source 10 is unable to reach the photo-electric cell 20. When the crystal 40 is set into oscillation between the electrodes 46 and 50 the light, during a portion of each cycle, is able to pass thru the crystal holder and reach the cell 20.

Referring now to Figure 4, the window 56 in the crystal holder 42 is made sufficiently large so that the crystal 40, even when oscillating, is always in view. Light from the source 10 is focused upon the crystal in such a direction that during only part of its cycle of oscillation the reflected light is properly directed to impinge upon the light sensitive cell 20. When the crystal is at rest upon the lower electrode 46 there is no illumination of the cell 20.

It is to be understood that although I have chosen to illustrate modifications in which the intensity of light energization of the photo-electric cell is increased during vibration it is equally possible to so arrange the apparatus that a steady light intensity is decreased during oscillation. It is further to be understood that the circuits indicated in Figure 1 have been reduced to their simplest possible form, and are intended only as an illustration, and not a limitation of my invention.

I claim:

1. Means to detect signal energy comprising a photo-electric cell, a source of light, and a piezo-electric crystal responsive to the signal energy cooperating with the source and the cell to cause a change in the light energization of the cell which is dependent upon vibration of the crystal at its own natural frequency.

2. Means to detect a signal of desired frequency comprising a photo-electric cell, a source of light, and a piezo-electric crystal whose natural frequency of vibration is the desired signal frequency cooperating with the source and the cell to cause a change in the light energization of the cell which is dependent upon vibration of the crystal.

3. In combination, a piezo-electric crystal of desired natural resonance frequency, a source of a beam of light focused upon the path of said crystal when it is oscillating, and a light sensitive cell illuminated by light from said source only when said crystal is in a state of free oscillation at its natural frequency.

4. In combination, means for detecting the presence of a current of a desired superaudible frequency comprising an electromechanical vibrating reflector mechanically resonant at the desired superaudible frequency, means to apply the superaudible current thereto, a source of radiant energy focused upon said reflector, and means responsive to radiant energy in the path of radiant energy reflected by the reflector.

5. In combination, a piezo-electric crystal, a holder for the crystal having a window across which said crystal may oscillate, a source of a beam of light focused upon said window, and a photo-electric cell positioned to be illuminated by the source when the crystal is in a state of oscillation.

6. The method of controlling a direct current by means of an alternating current of superaudible frequency which includes transforming the electrical alternations into resonant mechanical vibrations of like superaudible frequency, utilizing the mechanical vibrations to control light energy, and varying the magnitude of the direct current in response to the light energy.

7. The method of detecting and translating signals transmitted on a radio frequency carrier wave which includes collecting the radio frequency signal energy, transforming the radio frequency electrical alternations into radio frequency mechanical vibrations, utilizing the mechanical vibrations to control light energy at the radio frequency, transforming the light energy into unidirectional electrical energy, and translating the electrical energy.

8. The method of selecting, detecting, and translating signals transmitted on a radio frequency carrier wave of desired frequency, by means including a piezo-electric crystal having a natural period equal to that of the desired carrier wave, which includes collecting the radio frequency signal energy, transforming the desired radio frequency electrical alternations into radio frequency mechanical vibrations by resonating the crystal, utilizing the crystal vibrations to control light energy at the resonance frequency, converting the light energy into unidirectional electrical energy, and translating the uni-directional electrical energy.

9. An arrangement for controlling a direct current in response to an alternating current of superaudible frequency comprising vibrator means to change the electrical alternations into mechanical vibrations of like superaudible frequency, a source of light energy, means to control the magnitude of the direct current in respononse to the light energy, and means including the vibrator means for controlling the amount of light energy which reaches the direct current control means from the light source.

10. An arrangement for detecting and translating signals transmitted on a radio frequency carrier wave comprising means to collect the radio frequency signal energy, a vibrator for transforming the radio frequency electrical alternations into radio frequency mechanical vibrations, a source of light, a source of direct current, means for controlling the direct current in response to the light energization received thereby, and means including the vibrator for controlling the amount of light energy reaching the direct current control means from the light source.

11. An arrangement for selecting, detecting, and translating signals transmitted on a radio frequency carrier wave of desired frequency comprising means to collect the radio frequency signal energy, a piezo-electric crystal having a natural period equal to that of the desired carrier wave for transforming the radio frequency electrical alternations into radio frequency mechanical vibrations, a source of light, a source of direct current, means to vary the direct current in response to the light energization received thereby, and means including the piezo-electric crystal for directing light energy from said source to said direct current control means when the crystal is vibrating in resonance.

12. In combination, means for detecting the presence of a current of a desired superaudible frequency comprising a piezo-electric crystal having a crystalline reflecting surface, said crystal being mechanically resonant at the desired superaudible frequency, means for applying the superaudible current thereto, a beam of light energy focused upon the reflecting surface of said crystal when it is vibrated, and light resonant means variably energized with light energy reflected from said crystalline reflecting surface.

CLARENCE W. HANSELL.